United States Patent
Check

(10) Patent No.: US 10,653,129 B2
(45) Date of Patent: May 19, 2020

(54) LIGHTWEIGHT TREE STAND WITH EMBEDDED CONTINUOUS FIBER MEMBERS

(71) Applicant: Horizon Innovation, LLC, Kimberly, WI (US)

(72) Inventor: Paul Check, Kimberly, WI (US)

(73) Assignee: Horizon Innovation, LLC, Kimberly, WI (US)

( * ) Notice: Subject to any disclaimer, the term of this patent is extended or adjusted under 35 U.S.C. 154(b) by 66 days.

(21) Appl. No.: 15/865,437

(22) Filed: Jan. 9, 2018

(65) Prior Publication Data
US 2018/0192634 A1    Jul. 12, 2018

Related U.S. Application Data

(60) Provisional application No. 62/445,491, filed on Jan. 12, 2017.

(51) Int. Cl.
*A01M 31/02*    (2006.01)

(52) U.S. Cl.
CPC ................. *A01M 31/02* (2013.01)

(58) Field of Classification Search
CPC .................................................. A01M 31/02
See application file for complete search history.

(56) References Cited

U.S. PATENT DOCUMENTS

| 2,885,132 | A | * | 5/1959 | Campbell | ................ | E06C 7/08 |
| | | | | | | 182/228.2 |
| 3,158,224 | A | * | 11/1964 | Van Name | ................ | E06C 7/08 |
| | | | | | | 182/46 |
| 5,060,756 | A | * | 10/1991 | D'Acquisto | ........ | A01M 31/025 |
| | | | | | | 108/152 |
| 5,163,532 | A | * | 11/1992 | McCarty | ................... | E06C 1/32 |
| | | | | | | 182/108 |
| 5,217,221 | A | * | 6/1993 | Baum | ...................... | B27D 1/08 |
| | | | | | | 473/561 |
| 5,507,362 | A | * | 4/1996 | Krueger | ............. | A62B 35/0068 |
| | | | | | | 182/187 |
| 5,515,942 | A | * | 5/1996 | Woodfield | ................ | E06C 7/08 |
| | | | | | | 182/194 |

(Continued)

*Primary Examiner* — Colleen M Chavchavadze
(74) *Attorney, Agent, or Firm* — Andrus Intellectual Property Law, LLP

(57) ABSTRACT

A lightweight tree stand that includes a support platform formed from a molded plastic material. The support platform includes an edge member that defines the perimeter of the support platform and includes a plurality of primary ribs extending between the edge member. The edge members and the primary ribs are integrally molded and each includes an embedded reinforcement rod formed from a continuous fiber material. The continuous fiber material increases the strength without increasing the weight of the support platform. The support platform includes a plurality of secondary ribs that are positioned and configured to define decorative openings within the support platform. The support platform includes one or more tree branch holders that are integrally molded with the edge member and receive artificial tree branches. A frame of the tree stand can include a keyhole that receives a mating key mounted to a tree at a desired location and height.

12 Claims, 6 Drawing Sheets

(56) References Cited

U.S. PATENT DOCUMENTS

| | | | | |
|---|---|---|---|---|
| 5,515,943 | A * | 5/1996 | Antonelli | A01M 31/02 108/152 |
| 5,979,603 | A | 11/1999 | Woller | |
| 6,267,202 | B1 * | 7/2001 | Nelson | A01M 31/02 182/116 |
| 6,591,942 | B2 * | 7/2003 | Branca | B29C 65/02 182/228.1 |
| 8,448,748 | B2 * | 5/2013 | Allred | E04C 3/40 182/115 |
| 8,720,646 | B2 * | 5/2014 | Schlipf | A01M 31/02 182/187 |
| 8,789,653 | B2 * | 7/2014 | Priest | A01M 31/02 182/100 |
| 8,800,718 | B2 * | 8/2014 | Allred | E04C 3/40 182/178.2 |
| 8,997,933 | B2 | 4/2015 | Furseth et al. | |
| 9,027,709 | B2 * | 5/2015 | Wheelington | A01M 31/02 182/129 |
| 2002/0148685 | A1 * | 10/2002 | Shan | A01M 31/02 182/187 |
| 2003/0205653 | A1 * | 11/2003 | Peterson | A01M 31/02 248/286.1 |
| 2015/0151506 | A1 | 6/2015 | Hawley et al. | |
| 2017/0265454 | A1 * | 9/2017 | Kramer | A01M 31/02 |

\* cited by examiner

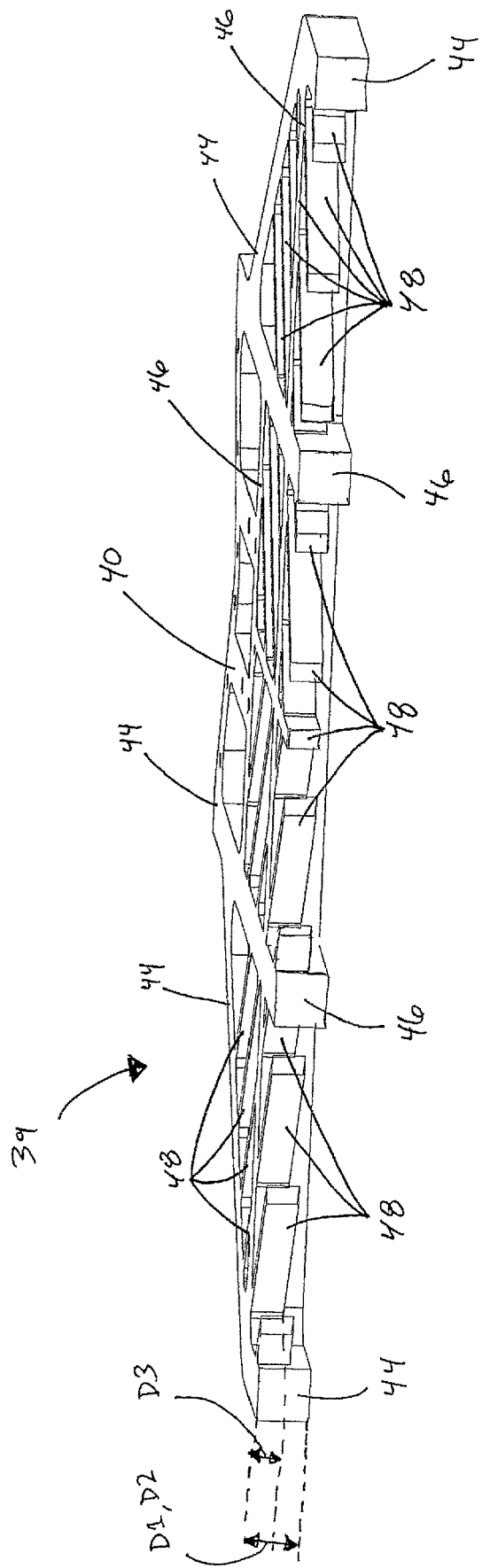

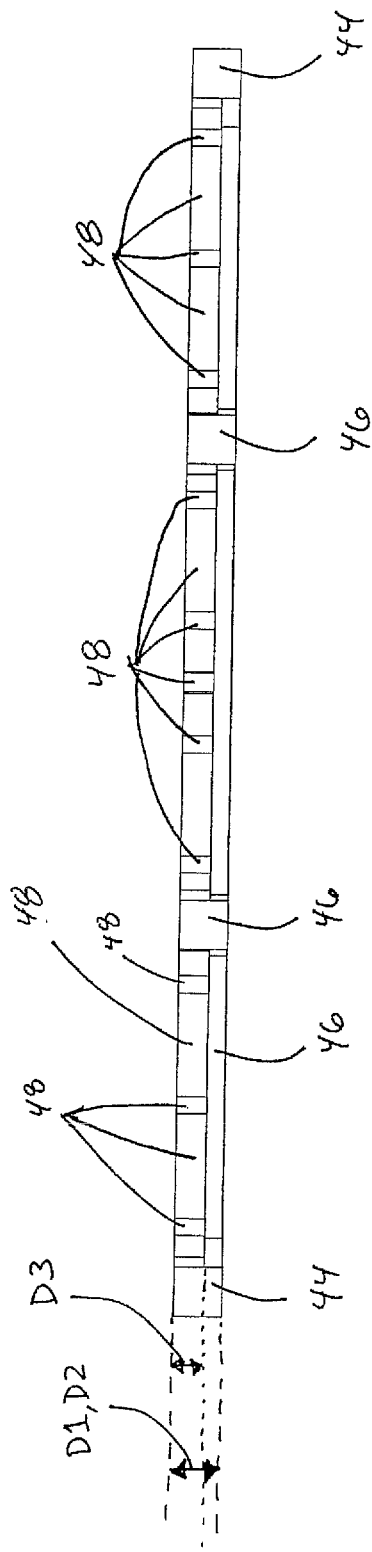

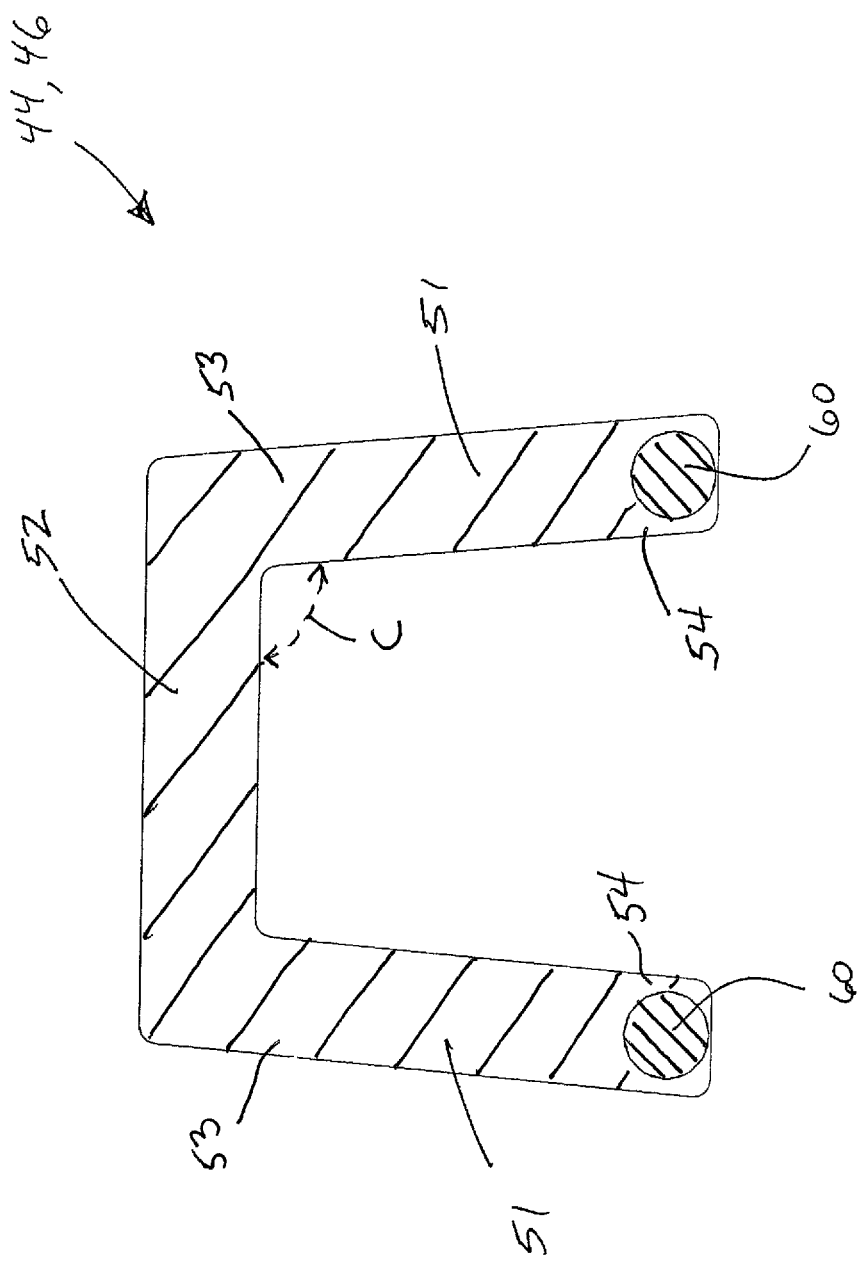

LIGHTWEIGHT TREE STAND WITH EMBEDDED CONTINUOUS FIBER MEMBERS

CROSS REFERENCE TO RELATED APPLICATION

The present application is based on and claims priority to U.S. Provisional Patent Application Ser. No. 62/445,491 filed on Jan. 12, 2017, the disclosure of which is incorporated herein by reference.

BACKGROUND

The present disclosure generally relates to tree stands for use in observing and hunting wildlife from an elevated position. More specifically, the present disclosure relates to a tree stand that is formed from a molded thermoplastic material that includes embedded rods to increase the strength of the tree stand while maintaining low overall weight.

Tree stands are typically anchored to and supported by or against a tree trunk. Conventional tree stands must have sufficient structural properties (e.g. high strength, stiffness, and high impact resistance) to safely support a user and any gear (e.g. cameras, guns, food, clothing, blinds) with minimal deflection and/or deformation of a horizontal support platform of the tree stand. Typically, conventional tree stands are made out of metal or a metal alloy in order to safely support the user. Metal tree stands are durable and have the required strength but are heavy and difficult to position on or attach to the tree trunk. Since the tree stand is typically carried by the user into the woods for use, decreasing the overall weight of the tree stand is a benefit to the user.

Accordingly, the prevent inventor has developed the tree stand of the present disclosure that is lightweight and safely supports the user. Specifically, the prevent inventor has developed a molded plastic tree stand that utilizes lightweight plastic materials with embedded continuous rods formed from fiber members to dramatically reduce the weight of the tree stand (in comparison with conventional metal tree stands) and safely support the user. Furthermore, erection and assembly of the tree stand is simplified due to the reduced weight of the tree stand of the present disclosure.

SUMMARY

The present disclosure generally relates to a lightweight, portable tree stand for supporting a person on a trunk of a tree. The portable tree stand includes a frame that is configured to removably couple the tree stand to the trunk of the tree. In one embodiment, the frame is formed from a molded thermoplastic material and includes an upper portion and a lower portion. The upper portion of the frame provides the required support for a seat when the frame is mounted to the tree. A lower portion of the frame is connected to a support platform, where the entire support platform is integrally molded from a thermoplastic material.

The support platform includes an edge member that defines a perimeter of the support platform. A plurality of primary ribs are connected to the edge member and extend across the interior of the perimeter formed from the edge member. The combination of the edge member and primary ribs creates an upper support surface of the support platform. The primary ribs and the edge member are integrally molded from a thermoplastic material.

In one embodiment of the disclosure, a reinforcement rod is embedded into each of the primary ribs and into the edge member. The reinforcement rod is formed from continuous fiber members and is placed within a mold and the thermoplastic material that forms the support platform surrounds the reinforcement rod. The reinforcement rod formed from the continuous fiber member creates additional strength and durability for each of the primary ribs and the edge member, which allows the support platform to be integrally molded from a lightweight plastic material.

In addition to the plurality of primary ribs, the support platform can include a plurality of secondary ribs that extend either between the primary ribs or between one of the primary ribs and the edge member. The secondary ribs can be formed and shaped in a variety of different patterns and configurations. The secondary ribs provide additional support for the support surface and also define a plurality of cutouts, which may be decorative. In some embodiments of the disclosure, the decorative cutouts formed by the secondary ribs can have the shape of a leaf, a letter, a logo or any other decorative appearance as desired.

The support platform can further include an attachment section that includes a contact surface configured to engage the tree trunk. Likewise, the upper section of the frame includes an upper attachment bracket that also has a contact surface that engages the outer trunk of the tree. Both of the contact surfaces are V-shaped to receive the curved outer surface of a tree.

In one embodiment of the present disclosure, the portable tree stand includes a keyhole formed in the frame. A mating key is mounted to the tree such that when the key is received within the keyhole, the combination of the key and keyhole support the weight of the tree stand on the trunk of the tree. The frame of the tree stand can be removed from the tree by removing the key from the keyhole. In one embodiment of the disclosure, the key can remain on the tree such that the entire tree stand can be quickly and easily mounted in a desired location.

In one embodiment of the present disclosure, the tree stand includes one or more tree branch holders that are connected to the edge member of the support frame. Each of the tree branch holders includes an inner receptacle that is sized to receive a mating plug, which in turn is mounted to an artificial tree branch. The interaction between the tree branch holder and the mating plugs allows the artificial branches to be selectively positioned on the tree stand to further camouflage the tree stand during use.

BRIEF DESCRIPTION OF THE DRAWINGS

The drawings illustrate the best mode presently contemplated of carrying out the disclosure. In the drawings:

FIG. 5 is a cross section view of a platform of the tree stand taken along line 5-5 of FIG. 1;

FIG. 6 is an end view similar to FIG. 1; and

FIG. 7 is a cross section view of an edge member or a rib.

DETAILED DESCRIPTION

Figure 1:
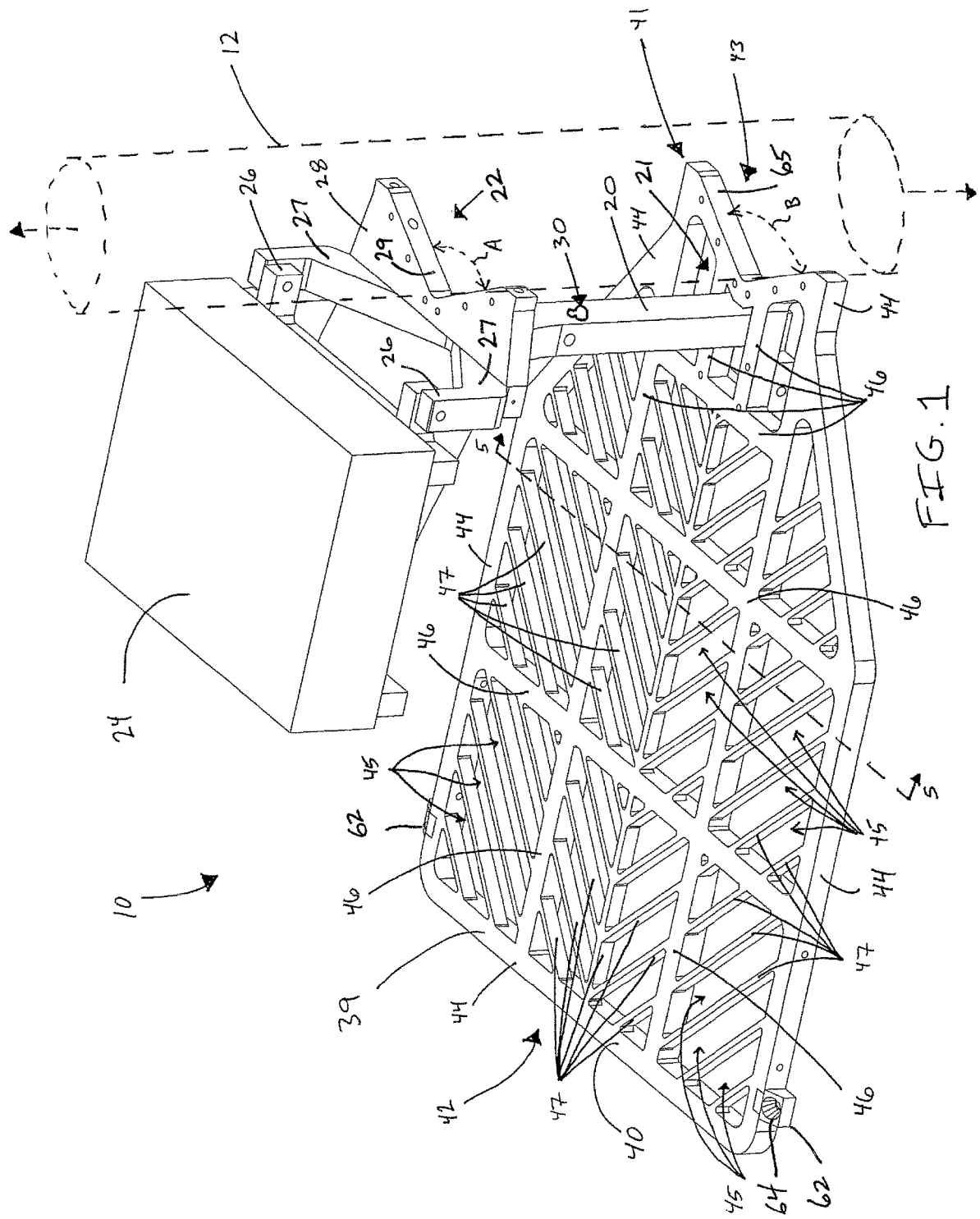
FIG. 1 is a top perspective view of a molded plastic tree stand.
Figure 2:
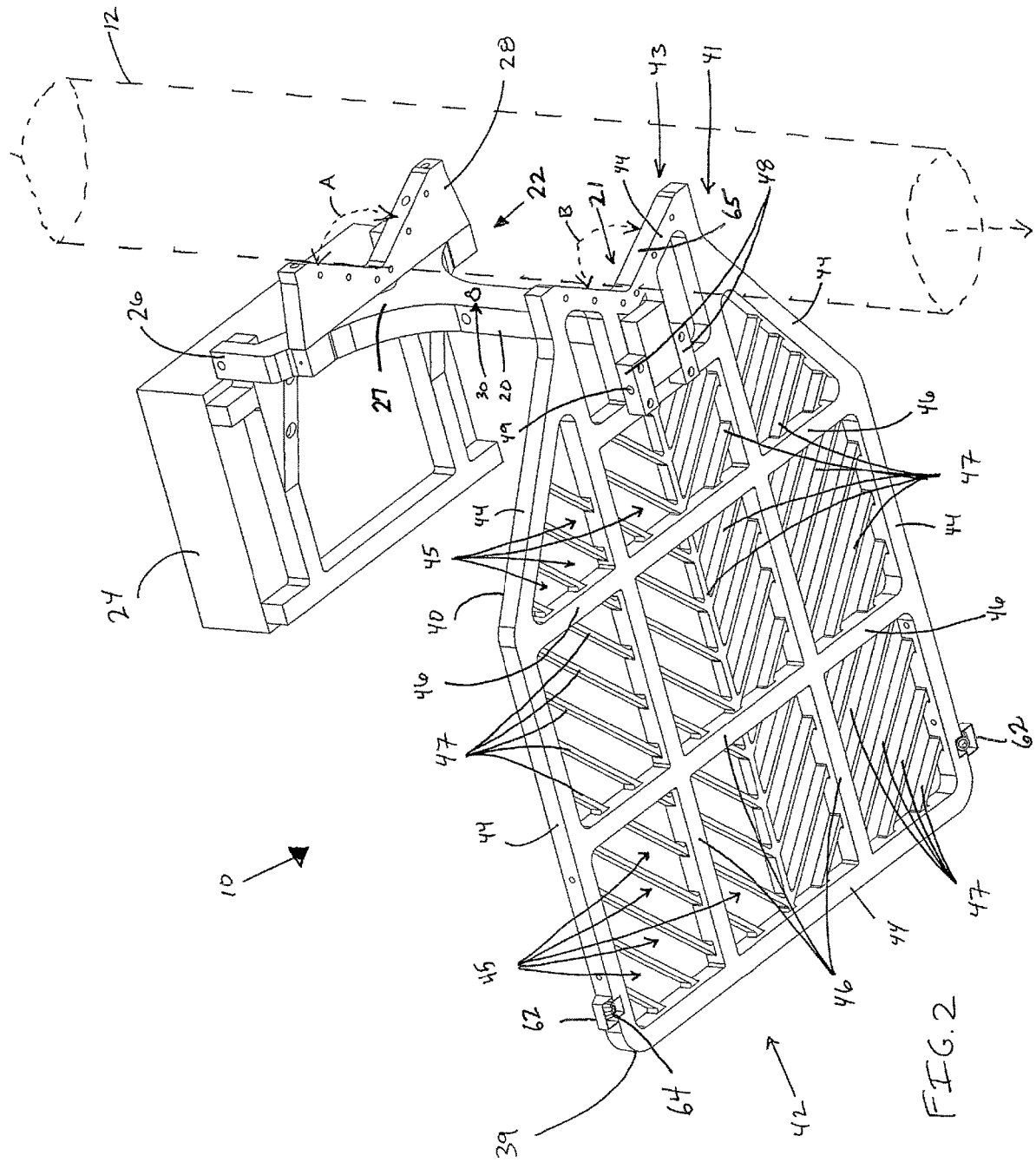
FIG. 2 is a bottom perspective view similar to FIG. 1.

The Figures depict a lightweight and portable tree stand 10 that is capable of supporting a user (and any gear) on a trunk of a tree 12 (depicted in dashed lines). The tree stand 10 includes a frame 20 that is configured to removably mount to a desired location on the tree 12. The frame 20 has a lower portion 21 that couples to and supports a support platform 39 (described further herein) and an upper portion 22 that supports a seat 24 on which the user can sit when the tree stand 10 is supported by the tree 12. The lower portion 21 is shown in FIGS. 1 and 2 as a square or rectangular member that has a hollow interior. In use, lower portion 21 is positioned in a generally vertical orientation that is parallel to the tree 12. The lower portion 21 includes a mounting arrangement that is configured to removably receive a pivot pin or pins that are configured to couple the support platform 39 to the lower portion 21 of the frame 20 (described further herein).

The upper portion 22 of the frame 20 includes a pair of support arms 27 that define a Y-shaped yoke that provide support for the seat 24. Each of the support arms 27 includes a seat hinge 26 that allows the user to pivot the seat 24 between a lowered, horizontal position (FIG. 1) in which the user can sit on the seat 24 and a raised, vertical position (not shown) in which the seat 24 pivots vertically upwardly toward the tree 12. The upper portion 22 includes an attachment bracket 28 attached or connected to the pair of support arms 27. The attachment bracket 28 includes a contact surface 29 that is configured to abut or contact the tree 12 when the frame 20 is supported on the tree 12 during use. The attachment bracket 28 defines the "V" shaped contact surface 29, which includes a pair of separate surfaces that define an obtuse angle A (FIG. 1). In certain examples, the attachment bracket 28 is removably coupled to support arms 27 of the frame 20 such that different attachment members (i.e. attachment members having different shapes and/or defining different angles) can be coupled to the frame 20 to accommodate trees 12 of different shapes and/or sizes.

When the tree stand 10 is installed on the tree 12, the user positions the frame 20 at a desired location and elevation along the tree 12 such that the attachment bracket 28 abuts the tree 12. The user then encircles the tree 12 with a first strap or rope, which is coupled to the attachment bracket 28. The first strap is tightened by a ratchet mechanism until the frame 20 is securely supported along the tree 12.

Figure 3:
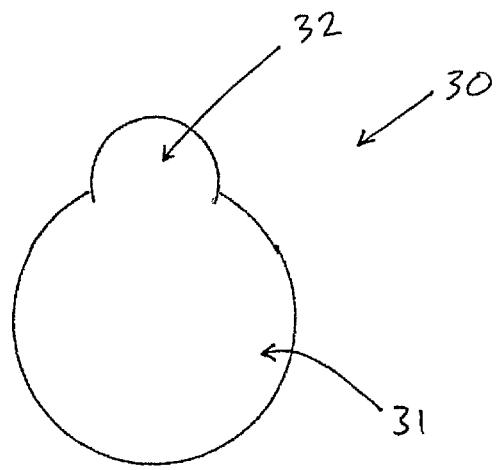
FIG. 3 is a keyhole formed in the tree stand.
Figure 4:
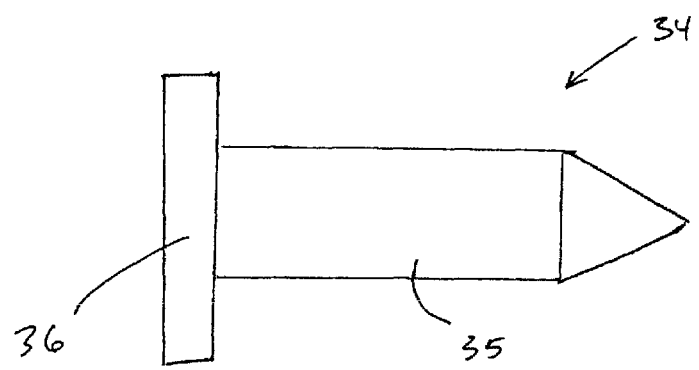
FIG. 4 is a key.

In the embodiment shown in FIGS. 1 and 2, the vertical upright of the lower portion 21 of the frame 20 includes a keyhole 30 (FIG. 2) formed on the surface that faces the tree 12. The keyhole 30 is configured to receive a mating key 34 (FIG. 3) that can be anchored to the tree 12 at a desired location. The key 34 projects radially outwardly from the outer surface of the tree 12. The key 34 is configured to receive and temporarily support the frame 20 on the tree while the user positions the upper strap coupled to the upper bracket 28 around the tree. The combination of the key 34 and keyhole 30 supports the weight of the tree stand while the user positions the straps around the tree. Once the strap is in place, the user can tighten the first strap around the tree 12 to secure the frame 20 to the tree 12 (as described above). It is contemplated that the user would leave the key 34 in position on the tree 12 after a day of hunting and would remove the tree stand each day. The next day, the key 34 would allow the user to much more quickly locate and mount the tree stand on the tree 12. Although only one key 34 and keyhole 30 are shown in the embodiment of the drawing figures, additional keys and keyholes could be formed on the lower portion 21 of the frame to provide additional weight support for the frame.

The shape of the keyhole 30 and/or key 34 can vary. In the example shown, the key 34 include a shaft 35 that is at least partially embedded in the tree 12 and an enlarged head 36. The shaft 35 can include external threads to increase the holding force once the key 34 is installed on the tree. The keyhole 30 includes a first section 31 that receives the enlarged head 36 and a second section 32 having a diameter less than the diameter of the first section 31. In operation, the frame 20 is first positioned such that the enlarged head 36 passes through the first section 31 of the keyhole 30 and then the frame 20 is moved vertically downwardly such that the shaft 35 of the key 34 is received in the second section 32 of the keyhole 30 and the enlarged head 36 prevents the frame 20 from moving radially outwardly from the tree 12. It will be recognized that the frame 20 can be supported by or securely coupled to the tree 12 by the key 34 or straps independently of each other.

The tree stand 10 includes an integrally molded support platform 39 that is formed from a thermoplastic material and is configured to support the user at an elevated position when the user stands on the platform 39. In one embodiment of the disclosure, the support platform is created using compression molding, although other molding techniques, such as injection molding, are contemplated as being within the scope of the present disclosure. The support platform 39 includes a generally planar support surface 40 on which the user stands, a first end 41 that couples to the lower portion 21 of the frame 20, and a second end 42 opposite the first end 41 that is cantilevered away from the frame 20. The first end 41 can be removably or pivotally coupled to the lower portion 21 of the frame 20. In the embodiment shown, the platform 39 includes a pair of hinge members 48 (FIG. 2) that each define a bore 49 there through. The bores 49 defined by the hinge members 48 are configured to align with the bore defined by the lower portion 21 of the frame 20, and a pin is received by the bores 49 defined by the hinge members 48 and the bore defined by the lower portion 21 of the frame 20 such that the platform 39 is vertically supported by and securely coupled to the frame 20.

The platform 39 includes an edge member 44 that is elongated and defines the perimeter of the platform 39 and a plurality of primary ribs 46 that are integrally molded with and coupled to the edge member 44 to thereby form a grid. The orientation of the edge member 44 and the primary ribs 46 relative to each other can vary, and in the example depicted, the primary ribs 46 are orthogonal to each other. In the embodiment shown, the edge member 44 and the primary ribs 46 have the same cross sectional shape, which will be further described in detail below.

The edge member 44 has an integrally molded attachment section 43 that is configured to abut or contact the tree 12 when platform 39 is coupled to the frame 20. The attachment section 43 (which is similar to the attachment member 28 of the frame 20) includes an outer end that is "V" shaped and includes a contact surface 65 that defines an obtuse angle B (FIG. 1). In operation, the user positions the platform 39 such that the contact surface 65 of the attachment section 43 abuts or contacts the tree 12. A second strap or rope (not shown) encircles the tree 12 and is coupled to the attachment section 43. The second strap is tightened by a ratchet mechanism until the platform 39 securely abuts the tree 12.

The platform 39 include a plurality of integrally molded secondary ribs 47 that span between the edge member 44 and one of the primary ribs 46 or between two of the primary ribs 46. The orientation and location of the secondary ribs 47 define a plurality of grating openings 45 between the secondary ribs 47 and between the secondary ribs 47 and the primary ribs 46. The size and/or the shape of the grating openings 45 and/or the secondary ribs 47 can vary and are dictated by the molding process. In the embodiment shown, the secondary ribs 47 are orientated at an angle relative to the primary ribs 46 to define a series of angled grating opening 45. However, the secondary ribs 47 could be configured such that the grating openings 45 may be shaped like a logo, letters (e.g. "HUNTING"), or other indicia. The grating openings 45 can alternatively be shaped like animals (e.g. deer), parts on animals (e.g. antlers), mascots, or nature elements (e.g. mountains, leaves, landmarks). The grating openings 45 can be shaped to further camouflage the tree stand and the user from wildlife (e.g. the grating openings 45 can be shaped to mimic the bare branches of the surrounds trees; the grating openings 45 can be shaped to mimic leaves of the surrounds trees). Since the entire support platform 39 is molded, the shape and design of the secondary ribs 47 can very greatly depending on the desired look of the support platform 39.

Referring specifically to partial section view of FIGS. 5-6, the edge member 44 has an edge member depth D1 extending from the support surface 40. The primary ribs 46 have a primary rib depth D2 extending from the support surface 40 that is equal to the edge member depth D1, and the secondary ribs 47 having a secondary rib depth of D3 extending from the support surface 40 that is less than the primary rib depth D1. The edge member depth D1 and the primary rib depth D2 are greater than secondary rib depth of D3 to thereby increase structural properties (i.e. the structural properties can include strength, stiffness, impact resistance, deflection resistance, yielding resistance, and/or the like) of the platform 39 when the user is on the platform 39. The secondary ribs 46 provide additional support for the use but can be made of a decreased depth to decrease the amount of material needed to form the support platform 39.

The cross section of the edge member 44 and the primary ribs 46 can vary. For instance, the cross section of the edge member 44 and the primary ribs 46 can be square (see FIGS. 1-2), triangular, circular, and/or the like. In accordance with one preferred embodiment, the cross section of the edge member 44 and the primary ribs 46 is "U" shaped as shown in FIG. 7. That is, the edge member 44 and the primary ribs 46 each include a pair of opposing legs 51 and a base 52 that extends between the opposing legs 51. The base 52 is positioned nearer the support surface 40 of the support platform 39 than the opposing legs 51, and the opposing legs 51 extend away from the base 52 and/or the support surface 40. Each opposing leg 51 has a first end 53 that is coupled to the base 52 and a second end 54 opposite the first end 53. Each of the opposing legs 51 defines an angle with respect to the base 52 to which the each of the opposing legs 51 is coupled thereto. The angle between the base 52 and the each of the opposing legs 51 can vary, and in the example illustrated in FIG. 7, each of the opposing legs 51 defines an obtuse angle C with the base 52. The "U" shaped cross section reduces the amount of material and weight of the edge member 44 and the primary ribs 46 without significantly reducing the structural properties of the platform 39 and/or the tree stand 10.

In the embodiment illustrated, the tree stand 10, including the frame 20 and the support platform 39, is formed entirely of compression molded thermoplastic material. The tree stand 10 can be formed using other types of molding process(es) (e.g. injection molding, transfer molding). Preferably, the thermoplastic material includes lightweight polymer materials, and the thermoplastic material possesses desired structural properties, such as high strength, stiffness, and high impact resistance, with a reduced weight when compared to materials used to form conventional tree stands (e.g. metal alloys, dense plastics).

In accordance with the present disclosure, the thermoplastic material that forms at least the edge member 44 and the primary ribs 46 includes a series of embedded reinforcement rods that extend along the entire length of the edge member 44 and along the length of each of the primary ribs 46 to increase the structural properties of the thermoplastic material. In addition, the frame 20 can also include the reinforcement rods to increase the strength of the frame 20. In the shown embodiment, the reinforcement rods are comprised of a series of bundled fiber members, such as those shown in U.S. Patent Publication No. 2015/0151506 (filed Feb. 12, 2015), the disclosure of which is incorporated herein by reference. U.S. Patent Publication No. 2015/0151506 provides description of example series of bundled fiber members that form the reinforcement rods that are incorporated into the edge member 44 and the ribs 46. However, it is contemplated that the reinforcement rods could be formed from other lightweight materials, such as a lightweight metal, while falling within the scope of the present disclosure.

Since the support platform 39 is formed from a molded thermoplastic material, the color of the thermoplastic material can be selected to configure the overall color and appearance of the tree stand 10. For example, the thermoplastic material can have multiple colors to create a camouflage color to blend in with the tree and hunting environment. The thermoplastic material could also be a single color, such as brown, green or black to blend in with the hunting environment.

To further increase the structural properties of the tree stand 10, the reinforcement rods 60 formed from the continuous fiber members are positioned within the tree stand mold and thus embedded into the thermoplastic material during formation of the tree stand. The reinforcement rods 60 are placed strategically within the thermoplastic structural elements to provide additional strength (e.g. tensile strength) where it is needed in the frame 20 and/or platform 39. For instance, multiple reinforcement rods 60 can be embedded in frame 20 between the lower portion 21 and the upper portion 22, including the support arms 27, to increase the structural properties of the frame 20. The reinforcement rods formed from the continuous fiber members can also be embedded in the hinge members 48 and in the lower portion 21 of the frame 20 to increase to the structural properties where the frame 20 couples to the platform 39. In certain examples, the reinforcement rods are tension members.

The present inventor has observed that is preferable to embed the reinforcement rods 60 formed from the continuous fiber members in the platform 39 to thereby increase the structural properties of the platform 39. Specially, reinforcement rods 60 are embedded in the edge member 44 and the primary ribs 46. In the instance where the edge member 44 and/or the primary ribs 46 are "U" shaped (as described above and shown in FIG. 7), a separate reinforcement rod 60 formed from the continuous fiber members are positioned in the each opposing leg 51 (i.e. a pair of pair of reinforcement rods 60 are disposed in each edge member 44 and/or primary ribs 46). The reinforcement rods 60 are positioned in the opposing legs 51 nearer the second ends 54 than the first ends 53 to thereby increase the structural properties of the platform 39. Preferably, the reinforcement rods 60 are embedded in the thermoplastic materials such that a sufficient amount of the thermoplastic materials encircles the reinforcement rods 60.

In the embodiment shown, the reinforcement rods 60 are cut to length to fit into the mold cavity before the thermoplastic material is injected into the mold cavity. Once the thermoplastic material sets, the molded product can be removed from the mold and the reinforcement rods 60 formed from the fiber members will be concealed within the thermoplastic material. It is contemplated that the fiber members of the reinforcement rods 60 will increase the strength and reduce the deflection of the platform 39 as compared to a platform formed only from the thermoplastic material.

In the embodiment of FIG. 7, each of the edge members 44 and primary ribs 46 have the U-shaped cross section as shown, where the reinforcement rods 60 are inserted into each of the spaced legs before molding. In an alternate embodiment in which the edge member 44 and the primary ribs 46 have a square cross section, the fiber members would be embedded into one of the outer walls of the molded member. In each case, the fiber members increase the strength of the molded member without significantly increasing the weight of the member.

Referring back to FIGS. 1 and 2, the tree stand 10 further includes one or more tree branch holders 62 that are integrally molded with the platform 39. In the embodiment shown, one of the holders 62 is integrally formed with each of the opposite lateral portions of the edge member 44. However, the holders 62 could be located in other location on the platform 39. Additionally, the tree branch holders could be separately molded items that are received within receiving slots formed in the edge member and locked in place by an adhesive or ultrasonic welding. Each of the holders 62 includes a tapered inner receptacle 64 that is sized to receive a mating plug (not shown) attached to an artificial tree branch. The interaction between the receptacle and mating plug allows artificial tree branches to be mounted to the tree stand and securely held in place. The artificial tree branches provided additional camouflage or cover for the tree stand when mounted within the tree. The tree branches can be mounted within the holders once the tree stand is in place, which increases the portability of the tree stand. In one embodiment, the tapered inner receptacle 64 includes a splined inner surface that locks the mating plug in place to prevent rotation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A lightweight portable tree stand for supporting a person on a trunk of a tree, the lightweight portable tree stand comprising:
    a frame configured to removably couple to the tree; and
    a platform having a first end coupled to the frame and a second end opposite the first end that is cantilevered away from the frame, wherein the platform has a edge member that forms a perimeter of the platform and at least one primary rib that extends across the perimeter of the platform and is joined to the edge member, wherein both the edge member and the at least one primary rib are formed from a molded thermoplastic material, and wherein the edge member and the at least one primary rib each include a pair of opposing legs and a base that extends between the opposing legs, wherein each of the opposing legs has a first end coupled to the base and a second end opposite the first end, wherein a reinforcement rod is embedded in each of the opposing legs nearer the second end than the first end to thereby increase structural properties of the platform.

2. The lightweight portable tree stand according to claim 1 wherein each of the reinforcement rods is formed from a series of continuous fiber members.

3. The lightweight portable tree stand according to claim 2, wherein the at least one primary rib is one of a plurality of primary ribs.

4. The lightweight portable tree stand according to claim 3, wherein the edge member has an edge member depth; wherein each of the plurality of primary ribs has a primary rib depth that is equal to the edge member depth; wherein the platform further includes a plurality of secondary ribs each having a secondary rib depth that is less than the primary rib depth.

5. The lightweight portable tree stand according to claim 1, wherein the frame includes an at least one contact member configured to contact the tree, wherein the contact member is "V" shaped and defines an obtuse angle.

6. The lightweight portable tree stand according to claim 5, wherein the edge member has an attachment section that includes a V-shaped contact surface configured to abut the tree.

7. The lightweight portable tree stand according to claim 1 wherein the thermoplastic material is colored to simulate a camouflage pattern.

8. The lightweight portable tree stand according to claim 1 further comprising:
    at least one keyhole formed in frame; and
    a key configured to be received in the keyhole when the key is attached to the tree such that the interaction of the keyhole and the key supports the frame along the tree.

9. A lightweight portable tree stand for mounting to a trunk of a tree, the lightweight portable tree stand comprising:
    a frame having a lower portion and an upper portion;
    a seat supported on the upper portion of the frame;
    an attachment bracket mounted to the upper portion of the frame and having a contact surface configured to engage the trunk of the tree;
    a support platform having a first end coupled to the lower portion of the frame, the support platform including an edge member that defines a perimeter of the support platform and a plurality of primary ribs connected to the edge member, wherein the edge member and the plurality of primary ribs each include a pair of opposing legs and a base that extends between the opposing legs, wherein each of the opposing legs has a first end coupled to the base and a second end opposite the first end, wherein the edge member and the plurality of primary ribs are integrally molded from a thermoplastic material; and
    a plurality of reinforcement rods each formed from fiber members, wherein at least one of the plurality of reinforcement rods is embedded into each of the opposing legs of the primary ribs and the edge member nearer the second end than the first end to increase the structural properties of the support platform .

10. The lightweight portable tree stand according to claim 9 further comprising:

at least one keyhole formed in frame; and a key configured to be received in the keyhole when the key is attached to the tree such that the interaction of the keyhole and the key supports the frame along the tree.

11. The lightweight portable tree stand according to claim 9 further comprising at least one tree branch holder integrally molded with and extending laterally from the edge member.

12. The lightweight portable tree stand according to claim 11 wherein the tree branch holder includes an inner receptacle that is configured to receive a mating plug.

* * * * *